United States Patent
Kizuki et al.

(10) Patent No.: US 8,311,276 B2
(45) Date of Patent: *Nov. 13, 2012

(54) OBJECT TRACKING APPARATUS CALCULATING TENDENCY OF COLOR CHANGE IN IMAGE DATA REGIONS

(75) Inventors: Takafumi Kizuki, Yokohama (JP); Shunichi Schichijo, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 723 days.

This patent is subject to a terminal disclaimer.

(21) Appl. No.: 12/318,140

(22) Filed: Dec. 22, 2008

(65) Prior Publication Data

US 2009/0175500 A1 Jul. 9, 2009

(30) Foreign Application Priority Data

Jan. 7, 2008 (JP) ................................ 2008-000768
Sep. 17, 2008 (JP) ................................ 2008-238606

(51) Int. Cl.
*G06K 9/00* (2006.01)
(52) U.S. Cl. ...................................................... 382/103
(58) Field of Classification Search ........................ None
See application file for complete search history.

(56) References Cited

U.S. PATENT DOCUMENTS

| 7,835,542 B2* | 11/2010 | Lin et al. ....................... 382/103 |
| 2008/0063236 A1* | 3/2008 | Ikenoue et al. ................ 382/103 |
| 2009/0175500 A1* | 7/2009 | Kizuki et al. .................. 382/103 |
| 2010/0150401 A1* | 6/2010 | Kizuki et al. .................. 382/103 |
| 2010/0296697 A1* | 11/2010 | Ikenoue ......................... 382/103 |

FOREIGN PATENT DOCUMENTS

| JP | 2004-282535 | | 10/2004 |
| JP | 2007-264860 | A | 10/2007 |
| JP | 2007-272436 | A | 10/2007 |

OTHER PUBLICATIONS

Deguchi, et al., Proc. IEEE Int. Conf. Computer Vision & Pattern Recognition, "Object tracking by the mean shift of regional color distribution combines with the particle-filter algorithm", pp. 506-509 (2004).*

K. Nummiaro et al., "An Adaptive color-based particle filter,"Image and Vision Computing vol. 21, Issue 1, Jan. 10, 2003, pp. 99-110, doi:10.1016/S0262-8856(02)00129-4, available online http://www.sciencedirect.com/science/article/pii/S0262885602001294.*

(Continued)

*Primary Examiner* — Jingge Wu
*Assistant Examiner* — Tahmina Ansari
(74) *Attorney, Agent, or Firm* — Nath, Goldberg & Meyer; Jerald L. Meyer; Stanley N. Protigal (57) ABSTRACT

An object tracking apparatus tracks an object on image data captured continuously. The object tracking apparatus includes an object color adjusting unit and a particle filter processing unit. The object color adjusting unit calculates tendency of color change in regions on image data and adjusts a color of the object set as an object color based on the tendency of color change to obtain a reference color. The particle filter processing unit estimates a region corresponding to the object on image data based on likelihood of each particle calculated by comparing a color around each particle with the reference color, using particles which move on image data according to a predefined rule.

3 Claims, 7 Drawing Sheets

OTHER PUBLICATIONS

Official Action, issued on Jan. 31, 2012, in the counterpart Japanese Application No. 2008-238606.
Isard, Micheal. et al., "Condensation—conditional density propagation for visual tracking", Int. J. Computer Vision, 1998, pp. 1-36, vol. 28.
Fujiyoshi, Hironobu. "Moving Image Concept Technique and Application Thereof", (2007), pp. 76-80, Text of Fujiyoshi Lab, Department of Computer Science, College of Engineering, Chubu University.

* cited by examiner

FIG. 7A
COLOR PHASE H

0  OBJECT  360
   COLOR
(COLOR PHASE)

FIG. 7B
COLOR PHASE H

NUMBER OF PARTICLES

0  Wh  360

FIG. 8A
COLOR SATURATION S

0  OBJECT  255
   COLOR
(COLOR SATURATION)

FIG. 8B
COLOR SATURATION S

NUMBER OF PARTICLES

0  Ws  255

FIG. 9A
COLOR VALUE V

0  OBJECT  255
   COLOR
(COLOR VALUE)

FIG. 9B
COLOR VALUE V

NUMBER OF PARTICLES

0  Wv  255

OBJECT TRACKING APPARATUS CALCULATING TENDENCY OF COLOR CHANGE IN IMAGE DATA REGIONS

BACKGROUND OF THE INVENTION

1. Field of the Invention

The present invention relates to an object tracking apparatus configured to track an object on image data captured continuously.

2. Description of the Related Art

In an image surveillance system or a video conference system, a camera system using images captured by a camera in various situations has been put into practical use. The camera system has a tracking function that automatically tracks an object concerned and captures the object while changing a capture region. For example, in the image surveillance system with the tracking function, when a suspicious individual is set as an object, the system tracks the suspicious individual and continues to capture him/her as surveillance images. Also, in the video conference system with the tracking function, when a speaker is set as an object, the system tracks the speaker and continues to capture him/her as conference images.

When a system continues to capture an object as images, there is a need for controlling a pan, a tilt, a zoom factor and the like of a camera according to movement of the object, in order to keep the object within angles of view of the camera. Therefore, the system has to recognize the object on each image and detect a moving direction of the object.

As a method for recognizing an object on an image and detecting a moving direction of the object, a background difference method or a frame difference method using luminance difference has been employed. Recently, an object tracking technique using a particle filter is studied as disclosed in a Patent document 1 (Japanese Unexamined Patent Application Publication No. 2004-282535) and non Patent documents 1 (M. Isard, A. Blake: CONDENSATION—Conditional Density Propagation for Visual Tracking, *Int. J. Computer Vision*, vol. 28, No. 1, pp. 5-28 (1998)) and 2 (Hironobu Fujiyoshi: Moving Image Concept Technique and Application Thereof, text of Fujiyoshi Lab, Department of Computer Science, College of Engineering, Chubu University, pp. 76-80 (2007)).

The particle filter is an approximative calculation method of Bayesian filtering using posterior probability. The particle filter describes a probability distribution function by a finite number of particles and makes a time-series prediction using the probability distribution function. Namely, the particle filter can be said to be Sequential Monte Carlo method based on sampling. Even if a distribution in time-series is not approximated by Gaussian distribution, the particle filter can trace an object concerned because it approximates the distribution in time-series by sets of positions and weights of particles. As described in the Patent document 1, when the particle filter is applied to a trace of an object, likelihood is calculated using a color of the object. In this case, the likelihood is calculated using an existence rate of pixels of color close to the color of the object in the vicinity of each particle, and then a position of the object is estimated based on the result of calculation.

As described above, in an object tracking process using the particle filter, an object is traced by setting a color of the object and increasing likelihood of particles arranged in the vicinity of the object.

However, since a color of an object on an output image from a camera is easily changed due to an adjustment for the object by the camera such as a white balance adjustment or an exposure adjustment, it is often the case that the color of the object on the output image differs from a real color of the object. Also, the color of the object on the output image is changed due to a degree of exposure to light or a degree of darkness by shadow with respect to the object. Therefore, in the object tracking process, even if such a color change occurs, it is required that accuracy of tracking the object is kept.

The Patent document 1 describes that the object tracking process adjusts to a color change of an object due to an illumination condition and the like by relearning a color of the object. However, when a color of object is changed, the object tracking process can not always keep accuracy of tracking the object because it merely updates the color of object on each frame. Especially, when the color of object is sharply changed, the object tracking process can not keep accuracy of tracking the object.

SUMMARY OF THE INVENTION

The present invention has an object to provide an object tracking apparatus that is capable of carrying out an object tracking process with high accuracy even if a color of an object is changed on image data.

In order to achieve the above object, the present invention provides an object tracking apparatus that tracks an object on image data captured continuously, comprising: a tracked object designation receiving unit that receives designation of an object to be tracked on image data; an object color setting unit that sets as an object color a color of the designated object to be tracked on image data; an object color adjusting unit that calculates tendency of color change in regions on image data and adjusts the set object color based on the calculated tendency of color change to obtain a reference color; and a particle filter processing unit that estimates a region corresponding to the designated object to be tracked on image data based on likelihood of each particle calculated by comparing a color around each particle with the obtained reference color, using particles which move on image data according to a predefined rule. Here, it is noted that the reference color corresponds to an object color adjusted in the exemplary embodiments.

In order to achieve the above object, the present invention provides an object tracking apparatus that tracks an object on image data captured continuously, comprising: a tracked object designation receiving unit that receives designation of an object to be tracked on image data; an object color setting unit that sets as an object color a color of the designated object to be tracked on image data; an object color adjusting unit that obtains as a reference color colors distributed so that, as an amount of color change from the set object color increases, the number of particles each of which likelihood is calculated based on a color related to the amount of color change decreases; and a particle filter processing unit that estimates a region corresponding to the designated object to be tracked on image data based on likelihood of each particle calculated by comparing a color around each particle with the obtained reference color, using particles which move on image data according to a predefined rule.

In a preferred embodiment of the present invention, the distribution is a standard normal distribution.

DESCRIPTION OF THE PREFERRED EMBODIMENTS

First Exemplary Embodiment

An object tracking apparatus according to a first exemplary embodiment of the present invention will be described below in detail, with reference to FIGS. 1 to 6B.

Figure 1:
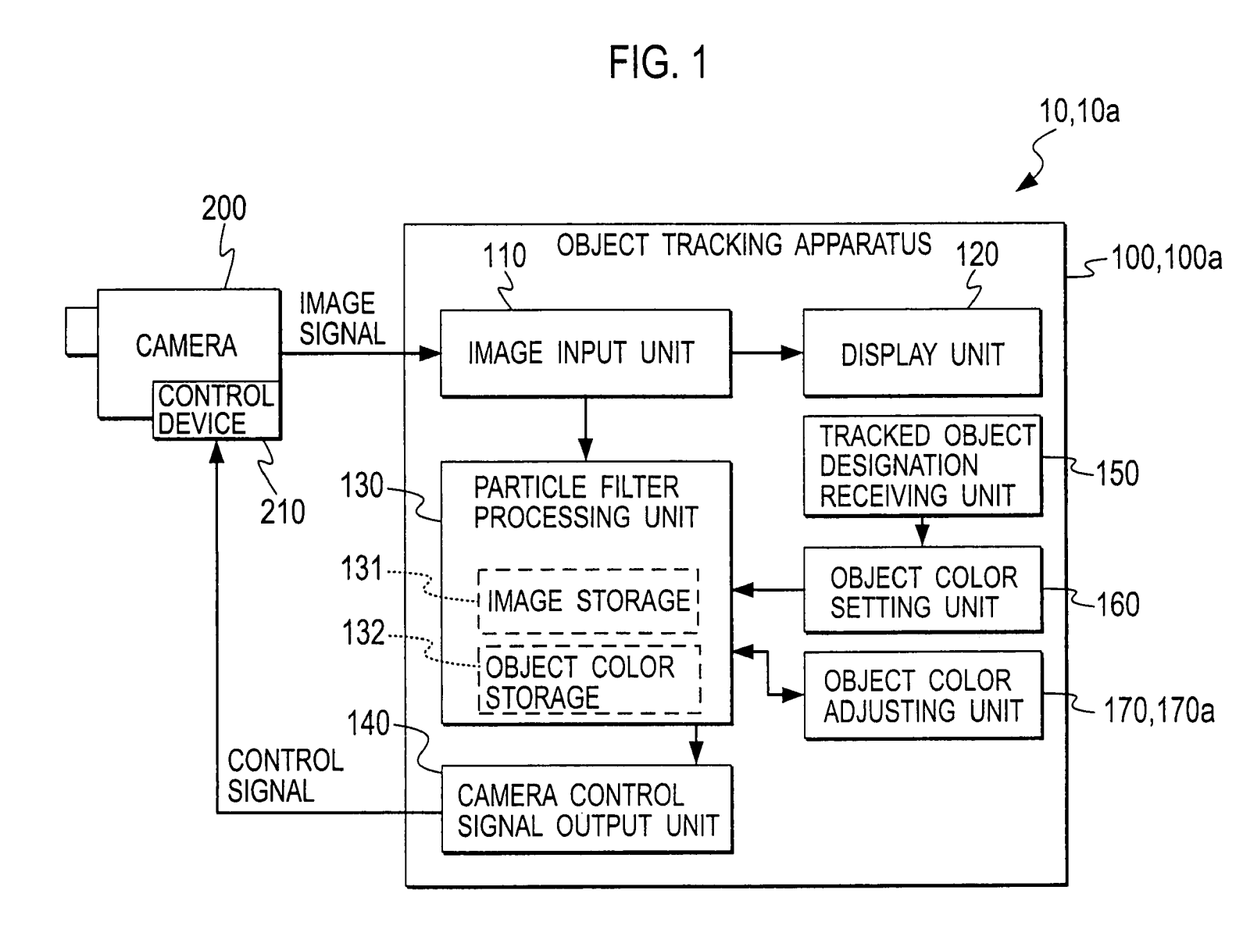
FIG. 1 is a block diagram of an object tracking system including an object tracking apparatus according to a first exemplary embodiment of the present invention.

As shown in FIG. 1, an object tracking system 10 includes an object tracking apparatus 100, a camera 200 and a control device 210. The camera 200 captures an object as image and outputs an image signal related to the image. The control device 210 carries out a pan-tilt control and a zoom factor control of the camera 200 according to a control signal from the object tracking apparatus 100. It is noted that the object tracking system 10 may allow the object tracking apparatus 100, the camera 200 and the control device 210 to be incorporated into an all-in-one apparatus.

The object tracking apparatus 100 includes an image input unit 110, a display unit 120, a particle filter processing unit 130, a camera control signal output unit 140, a tracked object designation receiving unit 150, an object color setting unit 160 and an object color adjusting unit 170. The image input unit 110 receives an image signal from the camera 200. The display unit 120 displays an image based on the received image signal thereon. The particle filter processing unit 130 carries out an object tracking process using particle filter. The camera control signal output unit 140 generates a control signal for the camera 200 based on a tracking result and then outputs the control signal to the control device 210. The tracked object designation receiving unit 150 receives designation of object to be tracked on an image displayed on the display unit 120. The object color setting unit 160 sets an object color according to an object designated. The object color adjusting unit 170 adjusts an object color set.

The particle filter processing unit 130 includes an image storage 131 and an object color storage 132. The image storage 131 stores therein image data to be processed so that the object tracking process using particle filter is carried out. The object color storage 132 stores an object color set.

For example, the object tracking apparatus 100 consists of a general information processing apparatus, such as a personal computer, provided with a CPU (central processing unit), a memory, an input-and-output device, a communication processing device and the like. The general information processing apparatus executes a program developed for particular application to function as the object tracking apparatus 100. It is noted that the object tracking apparatus 100 may consist of a designated apparatus.

We will describe an image tracking algorism using particle filter disclosed in the non Patent documents 1 and 2 below in detail. The image tracking algorism using particle filter is a method for approximating a posterior probability density $p(x_t|z_t)$, which is an estimated amount for a position of an object to be tracked in an image frame at time t, by a particle group consisting of N pairs $s_t^{(i)} = \{x_t^{(i)}, \pi_t^{(i)}\}$ (i=1, ..., N), where $x_t^{(i)}$ is a hypothesis of state $x_t$ of i-th particle at time t and $\pi_t^{(i)}$ is a weight of the hypothesis of state $x_t$ of i-th particle at time t, and then tracking an object. Here, a state quantity $\{x_t^{(i)}, \pi_t^{(i)}\}$ of i-th particle in an image frame at time t represents likelihood of the i-th particle.

When an observation value $z_t$ is obtained from an image frame at time t, a probability density in which a state $x_t$ of an object to be tracked is set as a probability variable is represented as the posterior probability density $p(x_t|z_t)$. The posterior probability density $p(x_t|z_t)$ is represented as $p(x_t|z_t) = \alpha p(z_t|x_t) p(x_t|z_{t-1})$ by Bayesian rule, where $\alpha$ is a constant value for normalizing $p(z_t|x_t) p(x_t|z_{t-1})$.

Condensation algorism disclosed in the non Patent document 1 repeatedly carries out an object tracking process by a select step, a predict step, and a measure step with respect to each image frame.

More specifically, in the select step, the process decentrally-arranges particles around an object to be tracked, measures likelihood of each particle, and selects N particles from among the particles in descending order of likelihood with a probability proportional to a value of likelihood. In the predict step, the process randomly disperses and rearranges the N particles selected in the select step. In the measure step, the process determines whether or not there are one or more pixels with color close to a color of the object in the vicinity of each particle, and calculates likelihood of each particle based on the determination. The process then executes weighted averaging of likelihood of all particles to estimate a position of the object.

The object tracking apparatus 100 improves an object tracking performance in the particle filter process by such algorism and carries out a process which will be described below. It is noted that the present invention may be applied to modified algorism other than the condensation algorism, if an image tracking process using particle filter is carried out according to the modified algorism.

Figure 2:
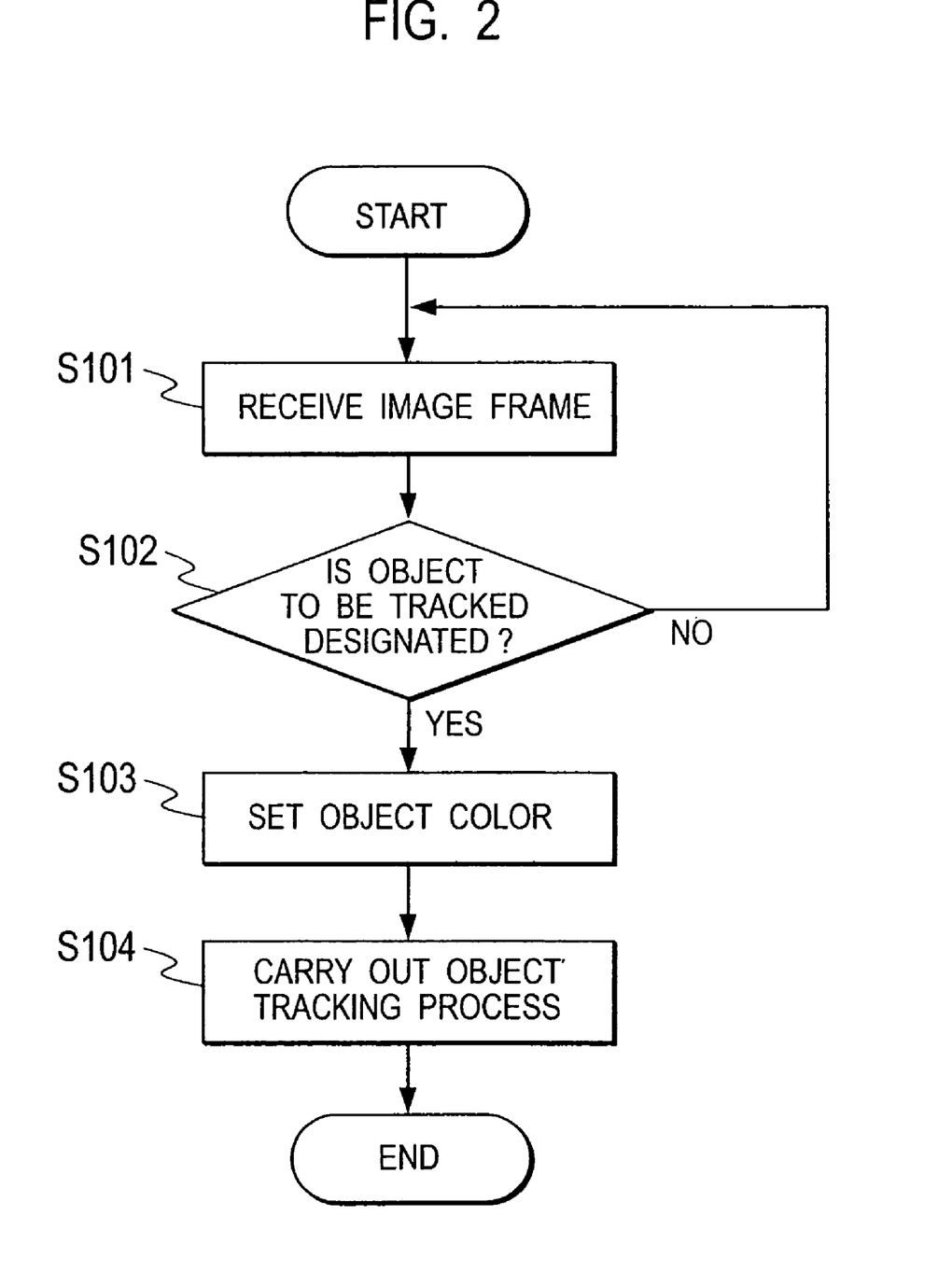
FIG. 2 is a flowchart of action of the object tracking apparatus according to the first exemplary embodiment of the present invention.

As shown in FIG. 2, in step S101, the object tracking apparatus 100 receives an image signal from the camera 200 in frame. In step S102, the object tracking apparatus 100 displays the received image signal as image on the display unit 120 in series and determines whether or not an object to be tracked is designated. In this state, an observer can designate a desired object to be tracked on image.

The object tracking apparatus 100 receives the designation of object to be tracked from the observer when he/she designates a region corresponding to a desired object displayed on the display unit 120 using an input device such as a mouse or a pointer. It is noted that the display unit 120 may consist of a touch panel type display device. In this case, the object tracking apparatus 100 receives the designation from the observer by recognizing a region touched by him/her on the display unit 120. It is further noted that the object tracking apparatus 100 may receive the designation from the observer via an external device.

If the object tracking apparatus 100 determines that an object to be tracked is designated, the process proceeds to step S103. If the object tracking apparatus 100 determines that an object to be tracked is not designated, the process returns to step S101. In step S103, the object color setting unit 160 obtains a color of one or more pixels corresponding to the region designated on image frame and sets the obtained color as an object color. The object color is set based on an RGB value of a single pixel corresponding to the region or an averaged RGB value of plural pixels corresponding to the region. The object color setting unit 160 stores the object color in the object color storage 132 and the image frame concerned in the image storage 131 when setting the object color.

When the object color is set, the particle filter processing unit 130 converts RGB color space into HSV color space in order to carry out a process on the HSV color space where an image is represented by color phase H, color saturation S and color value V. It is noted that the particle filter processing unit 130 may carry out a process on the RGB color space or convert the RGB color space into YUV color space to carry out a process on the YUV color space. In step S104, the object tracking apparatus 100 carries out an object tracking process to recognize the object to be tracked on image frame received from the camera 200 in series and controls the camera 200.

Next, the object tracking process in this embodiment will be described below in detail. This embodiment has the advantageous features that the object color adjusting unit 170 adjusts the object color according to color change in one or more regions other than the region corresponding to the object to be tracked on image frame and the object tracking apparatus 100 carries out an object tracking process using the adjusted object color.

Figure 3:
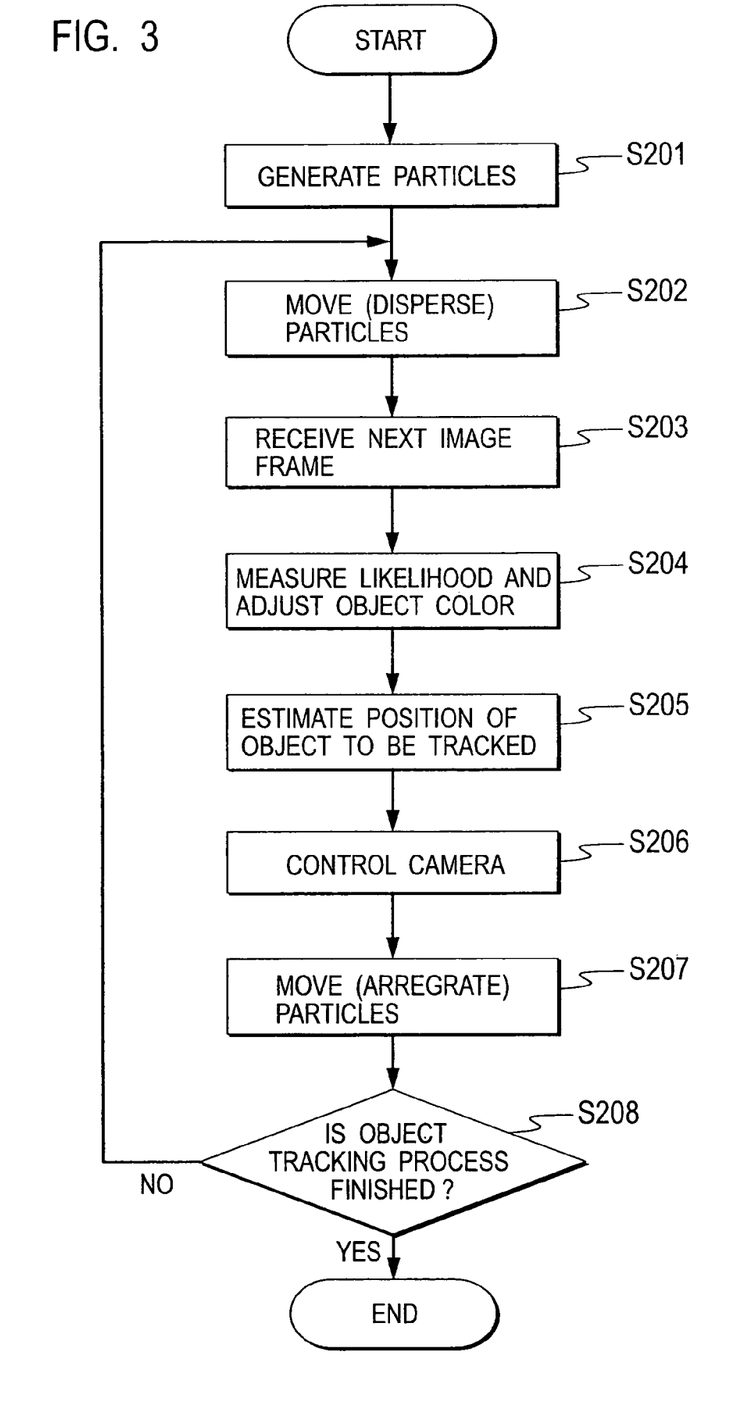
FIG. 3 is a flowchart of an object tracking process according to the first exemplary embodiment of the present invention.

The present invention is applied to not only particle filter algorism shown in FIG. 3. In an example shown in FIGS. 4A to 4E, a person's face is designated as an object to be tracked and a color of the person's face is set as an object color.

Figure 4A:
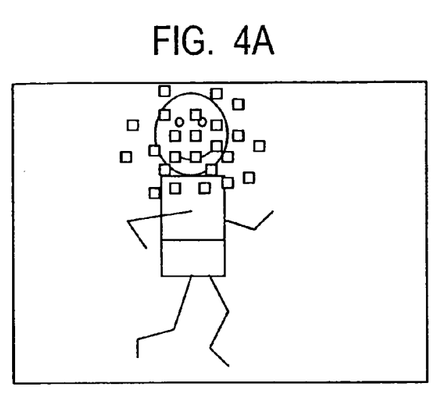
FIGS. 4A to 4E are explanatory diagrams of image frames and particles in the object tracking process according to the first exemplary embodiment of the present invention.

As shown in FIG. 3, in step S201, the particle filter processing unit 130 generates particles around the region designated in step S102 on the image frame of an initial sate where the observer designates the region in step S102. As the number of particles increases, tracking accuracy increases and processing speed decreases. FIG. 4A shows particles generated around a person's face to be tracked.

Figure 4B:
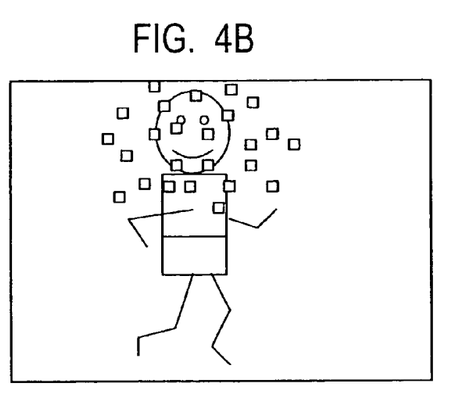

In step S202, the particle filter processing unit 130 moves the particles generated in step S201 according to a predefined rule. In a case where the particle filter processing unit 130 can predicts a moving direction of an object to be tracked, it determines moving directions of particles based on the predicted moving direction. In this embodiment, since an object to be tracked is supposed as a suspicious individual on surveillance image and motion dynamics of the suspicious individual is supposed as random dynamics, each particle moves a distance determined by a random number in a standard normal distribution. As a result, as shown in FIG. 4B, the particles disperse around the person's face.

Figure 4C:
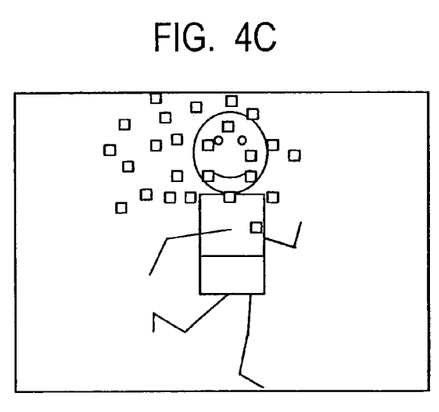
Figure 4D:
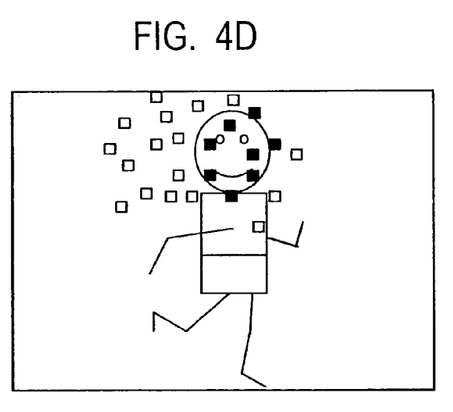

In step S203, the particle filter processing unit 130 receives a next image frame. This image frame is an image frame to be processed for detecting movement of an object to be tracked or the like. FIG. 4C shows the dispersing particles on the next image frame. The object to be tracked moves in a right direction on the next image frame. In step S204, the particle filter processing unit 130 calculates a ratio of pixels with color close to the object color with respect to pixels in the vicinity of each particle (e.g., pixels within a rectangular region around each particle) on the next image frame, to determine the calculated ratio as likelihood of each particle. For example, the particle filter processing unit 130 generates a HSV histogram regarding a rectangular region around each particle and calculates a degree of similarity to the object color to determine the likelihood of each particle. Particles with black shown in FIG. 4D are ones having relatively high likelihood.

In this embodiment, the particle filter processing unit 130 allows the object color adjusting unit 170 to adjust the object color stored in the object color storage 132 when measuring likelihood of each particle. More specifically, the object color adjusting unit 170 calculates tendency of total color change on an image frame and changes the object color based on the calculated tendency. Thereby, even if a color of an object to be tracked is sharply changed on an image frame due to a change of light source, a change of exposure or the like, the object tracking process can keep accuracy of estimation of position of the object to be tracked. This object color adjusting process is an essential part of this embodiment and will be described later in detail.

In step S205, the particle filter processing unit 130 calculates weighted averaging of likelihood of all particles to estimate a region corresponding to the object to be tracked on the next image frame. In this embodiment, a region including black particles shown in FIG. 4D is estimated as the region corresponding to the object to be tracked.

In step S206, the particle filter processing unit 130 allows the camera control signal output unit 140 to generate a control signal for keeping the estimated region corresponding to the object to be tracked within angles of view of the camera 200, and output the control signal to the control device 210. The control device 210 carries out a pan-tilt control and a zoom factor control of the camera 200 based on the control signal from the camera control signal output unit 140 so that the estimated region is kept within the angles of view of the camera 200. If an angle of view of the camera 200 is changed, the particle filter processing unit 130 processes a subsequent image frame in view of relative displacement of the object to be tracked on an image frame due to the change of angle of view of the camera 200. More specifically, the particle filter processing unit 130 adjusts a position of each particle so as to keep the relative positional relationship between each particle and the object to be tracked. This process is carried out using a conventional technique.

Figure 4E:
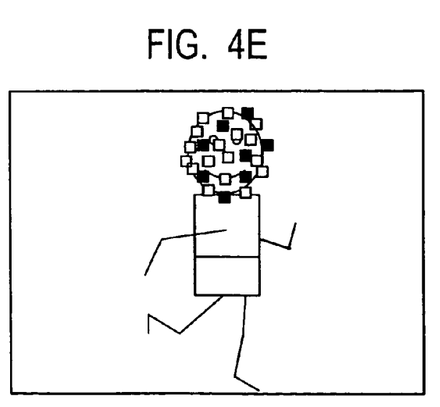

In step S207, the particle filter processing unit 130 moves particles having relatively low likelihood to positions where there are the particles having relatively high likelihood based on the determined likelihood of particles, in order to increases particles having relatively high likelihood stochastically. As shown in FIG. 4E, particles localize around the object to be tracked on the next image frame.

In step S208, the particle filter processing unit 130 determines whether or not the object tracking process is finished. If the object tracking process is not finished, the process returns to step S202, and the particle filter processing unit 130 again disperses particles localizing around the object to be tracked. If the object tracking process is finished, the process ends. For example, a case where the object to be tracked goes off the tracking range of the camera 200 or where a surveillant instructs the end of object tracking process is cited as a criterion for determining the end of object tracking process.

Next, the object color adjusting process which is an essential part of this embodiment will be described below in detail. The object color adjusting process is a process for calculating tendency of total color change on an image frame and changing the object color based on the calculated tendency. As described above, the particle filter processing unit 130 measures likelihood of each particle using the object color adjusted by the object color adjusting unit 170.

Figure 5:
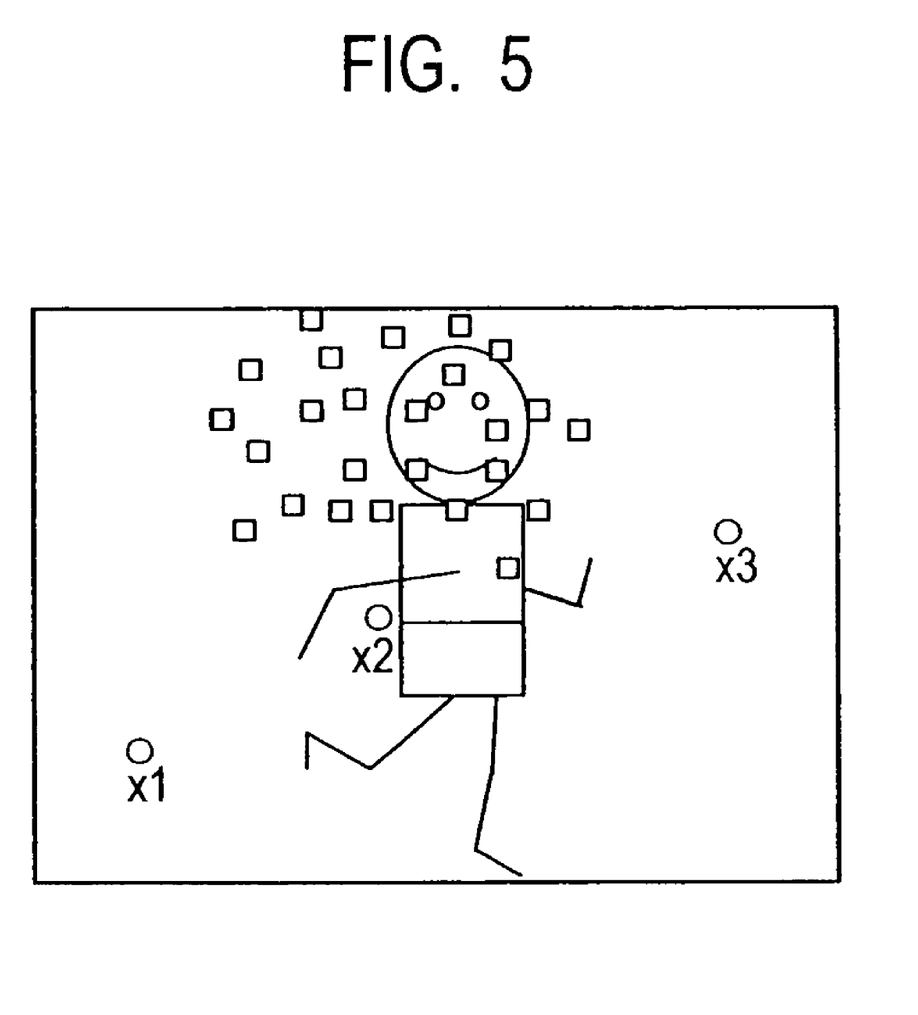
FIG. 5 is an explanatory diagram of process for obtaining color changes at regions other than an object tracking region according to the first exemplary embodiment of the present invention.

In this embodiment, the object color adjusting unit 170 obtains color change in one or more regions other than the region corresponding to the object to be tracked on image frame, in order to calculate tendency of total color change on an image frame. For example, in FIG. 5 showing particles dispersed from the region corresponding to the object to be tracked, the object color adjusting unit 170 calculates color change between the previous image frame and the current image frame to be processed, with respect to three positions x1, x2 and x3 in regions other than the region corresponding to the object to be tracked on the current image frame. Positions in the regions other than the region corresponding to the object to be tracked on the current image frame are fixed or randomly determined. It is noted that the number of positions is not limited to three.

Figure 6A:
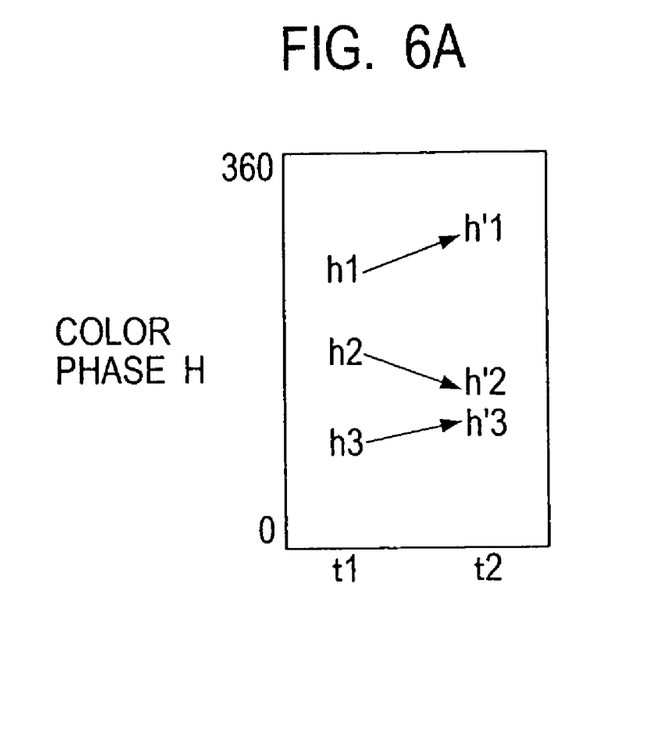
FIGS. 6A and 6B are explanatory diagrams of color phase changes according to the first exemplary embodiment of the present invention.
Figure 6B:
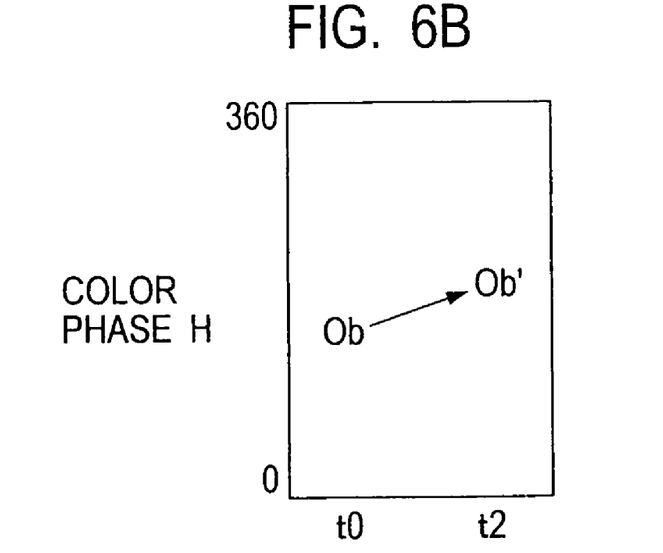

For example, as shown in FIG. 6A, color phases h1, h2 and h3 at the positions x1, x2 and x3 change to color phases h'1, h'2 and h'3 between the previous image frame at time t1 and the current image frame to be processed at time t2. In this case, the object color adjusting unit 170 calculates tendency of total color change on the current image frame based on these color phase changes. More specifically, the object color adjusting unit 170 calculates an average value of an amount of change of these color phases and sets the average value as tendency of total color change. It is possible to suppose that the tendency of total color change occurs due to a change of light source, a change of exposure or the like.

When the object color adjusting unit 170 calculates the tendency of total color change, it is desirable to remove color phase at a position where color change has a value more than a predefined threshold value from a set of color phases to be calculated because the position where color change is relatively large is supposed as a position where an object to be tracked comes to. Also, it is desirable to remove a color phase at a position where tendency of color change differs from one at other positions from a set of color phases to be calculated. In the example of FIG. 6A, the color phases at the positions x1 and x3 increase and the color phase at the position x2 decreases. Therefore, the object color adjusting unit 170 removes the color phase at the position x2 from a set of color phases to be calculated, and then calculates an average value of an amount of change of color phases at the positions x1 and x3. Further, in a case where an angle of view of the camera 200 is changed between the previous image frame and the current image frame, it is desirable to calculate color change of the object to be tracked in view of relative displacement of the object to be tracked between the previous image frame and the current image frame.

In this embodiment, the object color adjusting unit 170 applies the calculated tendency of total color change to an object color stored in the object color storage 132 to adjust the object color. For example, the object color adjusting unit 170 adds the average value of an amount of change of color phases at the position x1 and x3 with respect to an object color Ob stored in the object color storage 132 to obtain an adjusted object color Ob', and then the particle filter processing unit 130 calculates likelihood of each particle using the adjusted object color Ob'. Thereby, even if a color of an object to be tracked on an image frame differs from a real color of the object due to a change of white balance by a change of light source, a change of brightness by a change of exposure or the like, the object tracking process can keep accuracy of estimation of position of the object. Especially, if tendency of total color is sharply changed due to a change of brightness of the object to be tracked or the like, the object tracking process can keep accuracy of estimation of position of the object to be tracked.

It is noted that a calculation method of tendency of total color change is not limited to the calculation using an amount of change of color phase H. For example, the calculation method may use an amount of change of color saturation S and/or an amount of change of color value V. Also, the calculation method may calculate tendency of total color change on RGB color space or YUV color space.

Second Exemplary Embodiment

An object tracking apparatus according to a second exemplary embodiment of the present invention will be described below in detail, with reference to FIGS. 7A to 9B.

An object tracking system 10*a* according to the second exemplary embodiment has the same configuration shown in FIG. 1 as the object tracking system 10. Also, the object tracking system 10*a* has the same processes shown in FIGS. 2 and 3 as the object tracking system 10, except for the following process. In this embodiment, contents of object color adjusting process by an object color adjusting unit 170*a* of an object tracking apparatus 100*a* differ from ones by the object color adjusting unit 170 of the object tracking apparatus 100. For these reasons, overlapping drawings and explanations are omitted and the object color adjusting process by the object color adjusting unit 170*a* will be described below in detail. In this embodiment, the same reference numbers as the first exemplary embodiment are assigned to the same functional units as the first exemplary embodiment.

In the first exemplary embodiment, the object color adjusting unit 170 adjusts an object color based on tendency of total color change and the particle filter processing unit 130 applies the adjusted object color to all particles and calculates likelihood of each particle on an image frame. Thereby, even if a color of an object to be tracked on an image frame differs from a real color of the object, the object tracking process can keep accuracy of estimation of position of the object. On the other hand, in this embodiment, the object color adjusting unit 170*a* adjusts an object color by particle and the particle filter processing unit 130 applies each adjusted object color to each particle concerned and calculates likelihood of each particle on an image frame. Thereby, even if a color of an object to be tracked on an image frame differs from a real color of the object due to a change of white balance by a change of light source, a change of brightness by a change of exposure or the like, the object tracking process can keep accuracy of estimation of position of the object.

More specifically, the object color adjusting unit 170*a* changes values of color phase H, color saturation S and color value V stored in the object color storage 132, by particle, and then the particle filter processing unit 130 calculates likelihood of each particle. A magnitude of variation is set so that the number of particles each in which an amount of change is relatively small is larger than the number of particles each in which an amount of change is relatively large. Namely, as colors for reference, the object color adjusting unit 170*a* obtains colors distributed so that, as an amount of color change from an object color increases, the number of particles each of which likelihood is calculated based on a color related to the amount of color change decreases. For example, the relationship between the amount of color change and the number of particles each of which likelihood is calculated based on a color related to the amount of color change has a standard normal distribution. In this case, when it is supposed that $W_h$, $W_s$ and $W_v$ are random numbers which are distributed around values of color phase H, color saturation S and color value V of an object color so as to form standard normal distributions, values of color phase H', color saturation S' and color value V' of an adjusted object color have the following distributions: $H'=H+W_h$, $S'=S+W_s$ and $V'=V+W_v$.

Figure 7A:
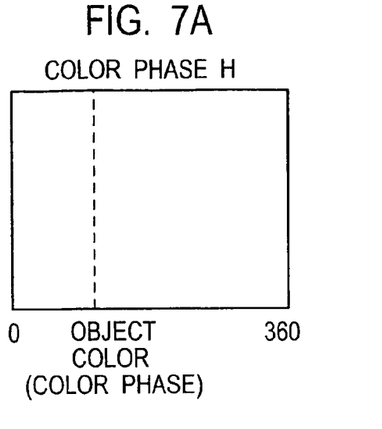
FIGS. 7A and 7B are graphs each showing relationship between color phase H and the number of particles according to a second exemplary embodiment of the present invention.
Figure 7B:
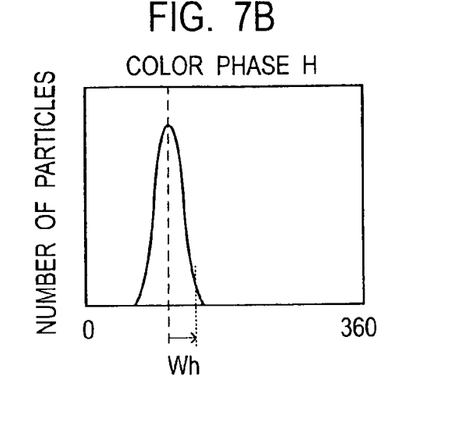
Figure 8A:
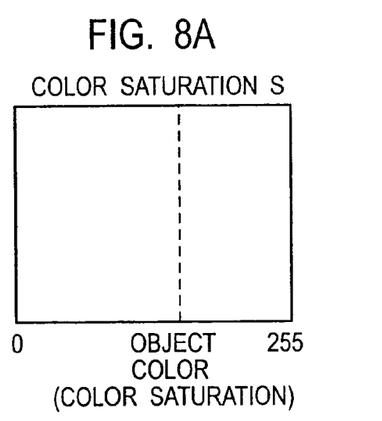
FIGS. 8A and 8B are graphs each showing relationship between color saturation S and the number of particles according to the second exemplary embodiment of the present invention.
Figure 8B:
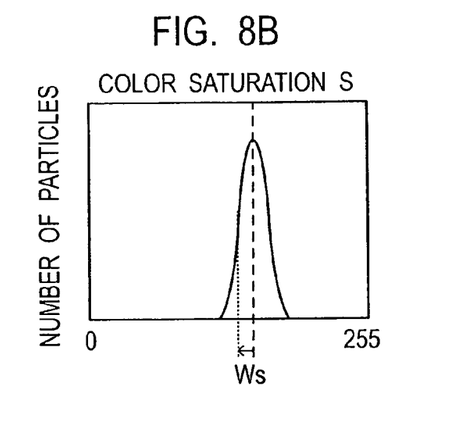
Figure 9A:
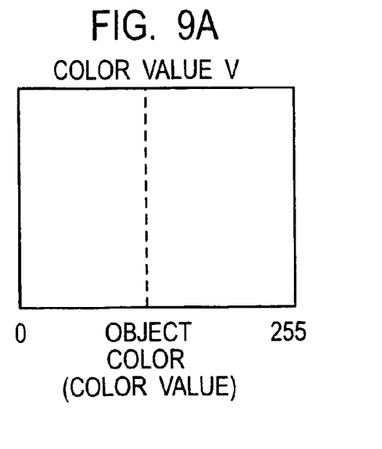
FIGS. 9A and 9B are graphs each showing relationship between color value V and the number of particles according to the second exemplary embodiment of the present invention.
Figure 9B:
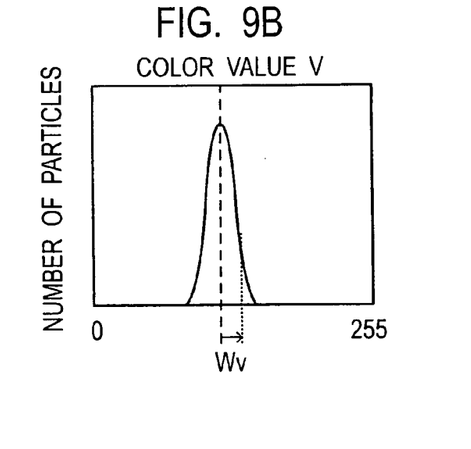

For example, when a color phase H of object color stored in the object color storage 132 has a value on a dotted line shown in FIG. 7A, a relationship between a value of color phase H and the number of particles each of which likelihood is calculated based on the value of color phase H has a standard normal distribution, shown in FIG. 7B, around the value of color phase H of object color. When a color saturation S of object color stored in the object color storage 132 has a value on a dotted line shown in FIG. 8A, a relationship between a value of color saturation S and the number of particles each of which likelihood is calculated based on the value of color saturation S has a standard normal distribution, shown in FIG. 8B, around the value of color saturation S of object color. When a color value V of object color stored in the object color storage 132 has a value on a dotted line shown in FIG. 9A, a relationship between a value of color value V and the number of particles each of which likelihood is calculated based on the value of color value V has a standard normal distribution, shown in FIG. 9B, around the value of color value V of object color. It is noted that the object color adjusting unit 170a may carry out the object color adjusting process on the RGB color space or the YUV color space other than the HSV color space.

Thus, the number of particles each of which likelihood is calculated based on a color related to an amount of color change from an object color being relatively small is set to be larger than the number of particles each of which likelihood is calculated based on a color related to an amount of color change from the object color being relatively large. This can increase likelihood of some particles in a set of particles distributed as an adjusted object color even if a color of an object to be tracked on an image frame is gradually changed, to continue to track the object on an image frame.

If increasing a range of object color where the number of particles is averagely distributed thereon regardless of a magnitude of amount of color change, the object tracking apparatus 100a can not distinguish an object to be tracked from another object having color close to a color of the object to be tracked on an image frame because it equally evaluates the result of calculation of likelihood in the range of object color. This often leads to misidentification of the object to be tracked. In contrast, in this embodiment, the number of particles each of which likelihood is calculated based on a color related to an amount of color change from an object color being relatively small is set to be larger than the number of particles each of which likelihood is calculated based on a color related to an amount of color change from the object color being relatively large. Thereby, the number of particles related to colors close to the object color and having relatively high likelihood is large and the number of particles related to colors away from the object color and having relatively high likelihood is small. As a result, the object tracking apparatus 100a can distinguish an object to be tracked from an object having color close to a color of the object to be tracked on an image frame, and handle a case where the number of pixels with an object color set initially gets smaller. Therefore, even if a color of an object to be tracked on an image frame differs from a real color of the object due to a change of white balance by a change of light source, a change of brightness by a change of exposure or the like, the object tracking process can keep accuracy of estimation of position of the object.

In a case where the object tracking apparatus always changes a color of an object to be tracked with reference to a color of the object to be tracked set initially at a time of calculating likelihood of each particle, this excels in address to a short-term change of color of the object. Thus, this excels in a case where a tracking time is relatively short. On the other hand, in a case where the object tracking apparatus updates a color of an object to be tracked to values of color phase H', color saturation S' and color value V' of particles having relatively high likelihood, in series, at a time of calculating likelihood of each particle, this excels in address to a long-term change of color of the object. Thus, this excels in a case where a tracking time is relatively long. The present invention can be applied to both cases where an object color is returned to a color set initially after adjusted and where an object color is updated in series.

In this embodiment, although the relationship between the amount of color change and the number of particles each of which likelihood is calculated based on a color related to the amount of color change has the standard normal distribution, it may have a single-peaked distribution such as a normal distribution, a binomial distribution or a linear (arithmetical) distribution other than the standard normal distribution. This alternative also has the same effect as this embodiment.

In the first and second embodiments, although the object tracking apparatuses 100 and 100a receive an object to be tracked on an image displayed on the display unit 120 from the tracked object designation receiving unit 150, they may automatically designate a position of an object to be tracked based on a result of motion detection process, color detection process or the like by a control unit (not shown). In this case, the display unit 120 and the tracked object designation receiving unit 150 may be omitted.

What is claimed is:

1. An object tracking apparatus that tracks an object on image data captured continuously, comprising:
a tracked object designation receiving unit that receives designation of an object to be tracked on image data;
an object color setting unit that sets, as an object color, a color of the designated object to be tracked on image data;
an object color adjusting unit that calculates tendency of color change in regions on image data and adjusts the set object color based on the calculated tendency of color change to obtain a reference color;
wherein the object color adjusting unit removes color change in an unnecessary region from the color change in the regions in the calculation for overcoming appearance change of the object; and
a particle filter processing unit that estimates a region corresponding to the designated object to be tracked on image data based on likelihood of each particle calculated by comparing a color around each particle with the obtained reference color, using particles which move on image data according to a predefined rule.

2. An object tracking apparatus that tracks an object on image data captured continuously, comprising:
a tracked object designation receiving unit that receives designation of an object to be tracked on image data;
an object color setting unit that sets, as an object color, a color of the designated object to be tracked on image data;
an object color adjusting unit that obtains as reference colors, colors normally-distributed around the set of object color such that the number of particles decreases with an increase in an amount of color change from the set object color, thereby the set of object color is adjusted by each particle; and
a particle filter processing unit that estimates a region corresponding to the designated object to be tracked on image data based on likelihood of each particle calculated by comparing a color around each particle with a reference color obtained by each particle, using particles which move on image data according to a predefined rule.

3. The object tracking apparatus according to claim 1, wherein the unnecessary region is a region where tendency of color change differs from one in the other region.

* * * * *